Inventor
Wilbur M. Garrett
By Munn, Anderson & Liddy
Attorney

Patented Apr. 13, 1937

2,076,988

UNITED STATES PATENT OFFICE 2,076,988

COTTON CLEANER

Wilbur M. Garrett, Anadarko, Okla.

Application March 24, 1936, Serial No. 70,653

1 Claim. (Cl. 19—72)

This invention relates to improvements in cotton cleaners, and its objects are as follows:

First, to provide an apparatus for removing dirt, sand, trash and other foreign matter from cotton and other material which can be handled in a manner similar to that herein contemplated, without the requirement of any moving part in the cleaner itself, thereby to avoid the possibility of a fire from sparking.

Second, to provide an apparatus for unloading cotton and the like or for removing cotton from one place of storage to another, and at the same time cleaning it of foreign matter.

Third, to provide a cotton cleaner which operates on the principle of cyclonic motion, the stream of air when whirling through the cleaner at a high rate of speed throwing the cotton against a screen which holds the cotton back and lets the foreign matter go through by centrifugal force, the clean cotton passing from the cleaner through one channel and the foreign matter through another.

Fourth, to provide an apparatus having the characteristics outlined above which is capable of use for cleaning seeds, grain and the like.

Other objects and advantages will appear in the following specification reference being had to the accompanying drawings, in which.

Figure 1:
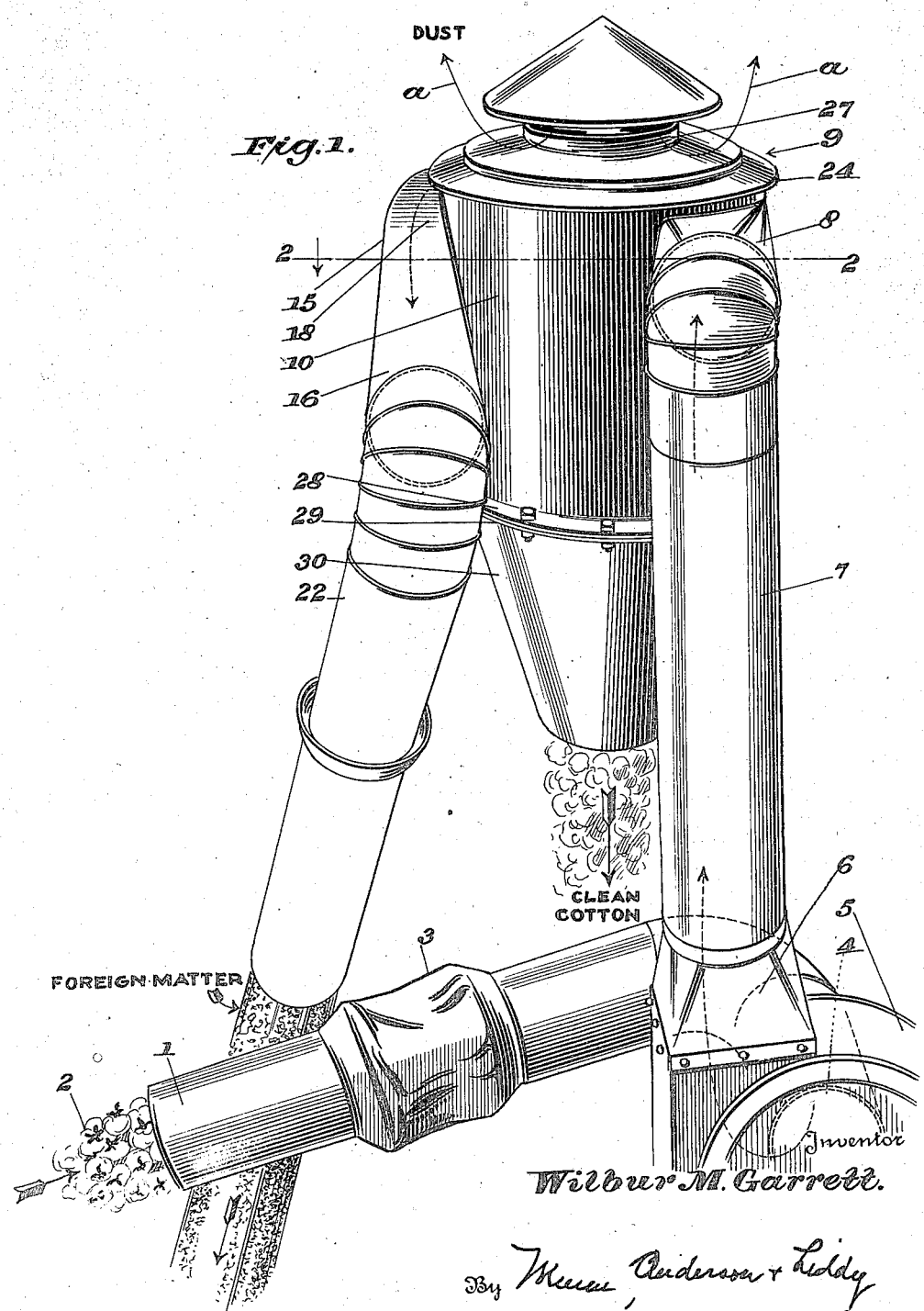
Figure 1 is a perspective view of the apparatus, illustrating the cotton cleaner combined with a blower.

In carrying out the invention provision is made of a pipe 1 which is the suction or supply pipe in that it reaches to the place whence the cotton 2 is to be unloaded. This pipe is preferably telescopic and it has a flexible joint 3 which maintains the necessary seal as the two sections of the pipe are moved with reference to each other. This supply pipe leads to the center inlet 4 of a suction fan or blower 5, the impeller of which (not shown) is appropriately screened so that the cotton will not entangle it. The outlet 6 of the blower has a pipe connection 7 with the inlet 8 of the cotton cleaner generally designated 9.

While the device 9 is here designated a cotton cleaner it is also an unloader, and, as already brought out above, it is one of the principles of the invention to clean the cotton simultaneously with the act of unloading or with transporting it from one place to another through the instrumentality of the cleaner apparatus. The inlet 8 is disposed tangentially with respect to the substantial upper end of the outer casing of the cleaner 9.

Figure 2:
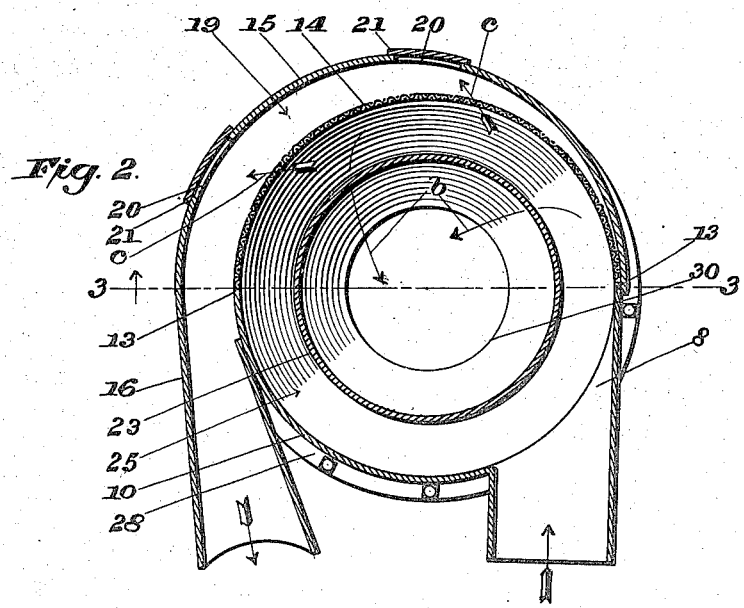
Figure 2 is a horizontal section taken on the line 2—2 of Fig. 1.

The outer casing is preserved in its identity as such for only part of the circumference (Fig. 2), approximately 180° of it being cut away at short distances 11, 12, from the bottom and top (Fig. 3) to provide an opening 13. The opening is filled with a semi-circular screen 14 which completes the shape of what would otherwise be a perfectly cylindrical casing. The portions marked 11 and 12 (Fig. 3) previously designated short distances, are continuous parts of the casing 10, and a section through each of them would show a perfect circle.

A wall 15 of helical form as far as it goes, confronts the screen 14, beginning substantially at the cotton inlet 8 and ending at the trash outlet 16. This wall has a bottom and top 17, 18 which together with the wall provides a cover or enclosure defining a trash passage 19. The wall 15 has one or more hand holes 20 with appropriately secured removable covers 21 for the inspection of the interior.

Figure 3:
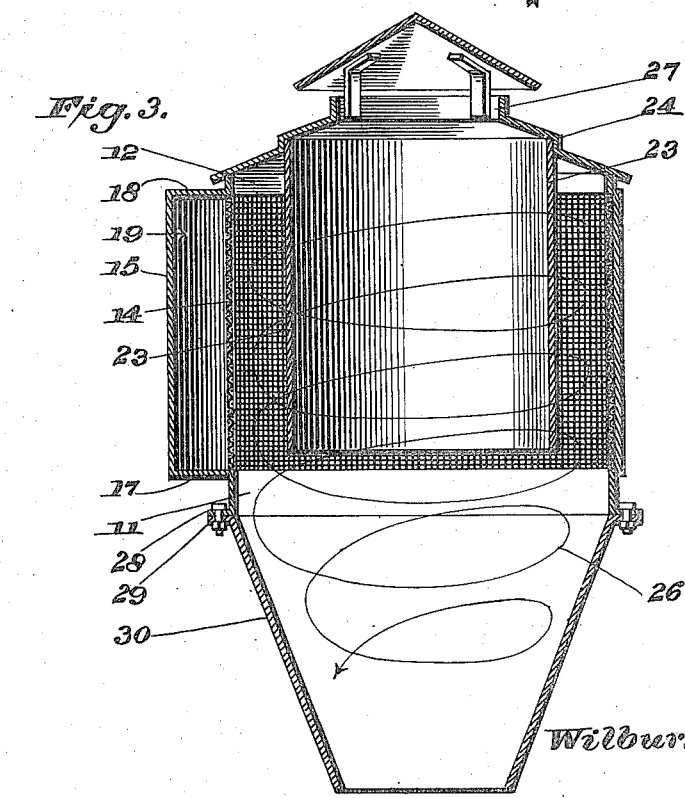
Figure 3 is a vertical section taken on the line 3—3 of Fig. 2.

The trash outlet 16 is connected with a discharge pipe 22 (Fig. 1). This pipe is made in any preferred way, being constructed as long as necessary to direct the foreign matter to the desired place of discharge. An inner housing 23 is made pendent from the roof 24 of the cleaner. It is fixedly held in concentric relationship to the casing 10 and its screen 14 to provide a space 25 into which the cotton is discharged, and which is traversed by the cotton with a cyclonic motion indicated by the spiral arrow 26 (Fig. 3).

The housing 23 ends substantially flush with the bottom of the screen 14. The lower end of this housing is open, as shown, and its upper end communicates with the hooded outlet 27 in the roof 24 through which outlet dust arising from the cleaning operation passes to the outer atmosphere (arrows a, Fig. 1).

Bolted flanges 28, 29 respectively on the portion 11 and on the discharge funnel 30 secure the latter to the outer casing 10. It is into and through this funnel that the clean cotton is discharged (arrows b, Fig. 2) to the point of disposal. This point may comprise a wagon, or the funnel may be piped up to a place of storage.

The operation is readily understood. The cotton 2 (Fig. 1) together with all of the foreign matter that usually accompanies it, enters the supply pipe 1 by virtue of the suction set up at the center inlet 4 by the operation of the impeller in the blower 5. From the latter it is blown to the top of the outer casing 10 through which it takes the spiral passage (arrow 26, Fig. 3) previously mentioned.

This spiral passage or cyclonic motion, as it has been called, is the result of the high rate at which the cotton is blown in plus the gravitational force that moves the cotton toward the bottom of the casing. As the cotton is swept against the screen 14 the foreign matter passes through (arrows c, Fig. 2) while the clean cotton goes down. The foreign matter that enters the passage 19 is discharged through the pipe 22. The lighter dust which is given off on the inside escapes at the outlet 27.

From what has been stated it is clear that the cleaning operation is performed without the use of any moving part excepting the impeller in the blower casing 5. As already stated, this impeller is screened so that none of the cotton will come in contact with it, but regardless of the screen there is nothing in the blower that can strike fire and since there is nothing of that nature in the cleaner 9 itself it follows that the fire hazard in the handling of cotton for moving and storing is reduced to a minimum.

I claim:

A cotton cleaner comprising an outer casing having an opening, a semi-circular screen fitted in said opening to complete said casing, a cotton inlet at the substantial top of the outer casing and disposed tangentially with respect thereto, a covering wall confronting the screen defining part of a helix which begins substantially at the inlet, bottom and top portions between said wall and the outer casing defining a trash passage, said passage merging into a trash outlet, a roof for the outer casing having a hooded dust outlet, an inner casing pendent from the roof and concentric with the outer casing to define a space for the circulation of cotton, and a discharge funnel pendent from the outer casing and in direct communication with said space.

WILBUR M. GARRETT.